United States Patent [19]
Hansen

[11] Patent Number: 5,821,930
[45] Date of Patent: *Oct. 13, 1998

[54] METHOD AND SYSTEM FOR GENERATING A WORKING WINDOW IN A COMPUTER SYSTEM

[75] Inventor: Benjamin Enoch Hansen, Westminster, Colo.

[73] Assignee: U S West, Inc., Englewood, Colo.

[*] Notice: The term of this patent shall not extend beyond the expiration date of Pat. No. 5,568,604.

[21] Appl. No.: 655,516

[22] Filed: May 30, 1996

Related U.S. Application Data

[63] Continuation of Ser. No. 294,268, Aug. 23, 1992, Pat. No. 5,568,604, which is a continuation-in-part of Ser. No. 999,489, Dec. 31, 1992, abandoned.

[51] Int. Cl.$^6$ ..................................................... G06F 15/00
[52] U.S. Cl. ........................... 345/340; 345/173; 345/348
[58] Field of Search ..................................... 345/156, 157, 345/163, 173, 179, 180, 9, 16; 395/334, 339, 340, 341, 342, 348, 349, 350, 351, 358

[56] References Cited

U.S. PATENT DOCUMENTS 5,305,435  4/1994  Bronson .................................. 345/351
5,347,295  9/1994  Agulnick et al. ....................... 345/156

*Primary Examiner*—Huynh Ba
*Attorney, Agent, or Firm*—Peter J. Kinsella; Brooks & Kushman P.C.

[57] ABSTRACT

A method and system for generating a working window on a video monitor in a computer system is provided. The method comprises the steps of determining if a user has performed a first predetermined input stroke along at least a portion of a display screen. Upon determining that the user has drawn the predetermined input stroke, a plurality of icons are displayed. A user selects one of the plurality of icons via a second predetermined input stroke and a working window is scrolled onto the video monitor. A computer program that corresponds to the selected icon is then executed in the working window. The user can remove the working window from the screen by clicking and performing a third predetermined input stroke.

32 Claims, 5 Drawing Sheets

# METHOD AND SYSTEM FOR GENERATING A WORKING WINDOW IN A COMPUTER SYSTEM

CROSS-REFERENCE TO RELATED APPLICATION

This application is a continuation of pending application Ser. No. 08/294,268, filed on Aug. 23, 1994 now U.S. Pat. No. 5,568,604, which is a continuation-in-part of application Ser. No. 07/999,489, filed on Dec. 31, 1992, now abandoned.

TECHNICAL FIELD

This invention relates to computer systems in general, and more particularly to a method and system for generating a working window in a computer system.

BACKGROUND ART

Since the introduction of personal computers in the early 1980s, there has been a continuing effort to make them easier and more intuitive to use. Early computer operating systems were entirely text-based and required a user to type in the individual commands that made the computer perform such tasks as opening a document, storing a document, deleting a document, etc. The text-based operating systems required a user to have a high degree of computer literacy in order to use the system properly. The operating system commands were generally non-intuitive and the systems were unforgiving in that each command had to be typed according to the proper syntax without a mistake before the command would be executed by the computer.

The popular systems produced in the second generation of personal computer operating systems were graphics based. For example, the Apple MacIntosh™ and the Microsoft Windows™ systems were a vast improvement over previous text-based operating systems. In a typical graphics-based operating system, a number of icons, i.e., graphical representations of various computer programs, are displayed on a computer screen. A user performs a task, such as executing a computer program, by selecting the icon that corresponds to the computer program with an input device, like a computer mouse. After selecting the icon with the mouse, a specific area in which the program appears on the screen, called a window, is displayed. The user then uses the program by typing in or using the mouse within the window. If the user wishes to execute another computer is program, another icon is selected, which in turn opens another window on the screen. Often a computer screen may have numerous windows open and overlapping each other, thereby making the screen appear cluttered and disorganized.

While the graphics-based operating systems and operations represent an improvement over the text-based operating systems, a user is still required to use a mouse or a keyboard to perform what would be a natural task in the real word. For example, many graphics-based operating systems are designed to simulate a desk top. On a real desk top, if a user wanted to work on a new project, he or she would simply pick up the document and move it into the work area of their desk. With current graphics-based operating systems, for a user to do the same thing on a computer, a user would have to use a mouse or keyboard to select an icon, open a new window, and adjust the size of the new window to occupy the desired area on the computer screen. Therefore, the user is required by the operating system to perform extra steps using a mouse that are not normally done by hand in the real world.

In the next generation of personal computers, it is desirable to remove barriers that exist between the user and the computer system itself. It is desirable that the user not be required to input commands using a keyboard or computer mouse so that the user becomes more interactive with the computer system. Also, it is desirable that an operating system be provided that allows the user to perform a task in a way that is intuitive to the user and in a way that is more analogous to the way in which the task is done in the real world. Finally, it is desirable to have an operating system where the user can easily eliminate extra windows that appear on a computer so that the screen does not become cluttered.

DISCLOSURE OF THE INVENTION

It is thus a general object of the present invention to provide a method and system for generating a working window in a computer system.

It is another object of the present invention to provide a method and system for generating a working window in a computer system upon recognizing a predetermined movement by the user of the computer system along at least a portion of the computer screen.

In carrying out the above objects and other objects of the present invention, a method is provided for generating a working window in a computer system having a video monitor with a touch-sensitive screen operable to generate electrical signals corresponding to user input strokes thereon.

The method begins with the step of generating a first electrical signal corresponding to a first user input stroke.

The method continues with the step of comparing the first electrical signal to a first predetermined electrical signal. The first predetermined electrical signal corresponds to a first predetermined user input stroke along at least a portion of the surface of the touch-sensitive screen. The first predetermined user input stroke is defined as a continuous movement on the touch-sensitive screen by the user from a predetermined area of the touch-sensitive screen to a predetermined interior portion of the touch-sensitive screen.

The method also includes the step of displaying a plurality of icons on the touch-sensitive screen if the first electrical signal matches the first predetermined electrical signal. The plurality of icons correspond to a plurality of computer programs.

The method further includes the step of generating a second electrical signal corresponding to a second user input stroke.

Next, the method includes the step of comparing the second electrical signal to a second predetermined electrical signal. The second predetermined electrical signal corresponds to a second predetermined user input stroke in which the user selects one of the plurality of icons displayed on the touch-sensitive screen. The second predetermined user input stroke is defined as momentarily touching one of the plurality of icons displayed on the screen.

Finally, the method concludes with the step of displaying a working window on the touch-sensitive screen if the second electrical signal matches the second predetermined electrical signal and executing the computer program corresponding to the icon selected by the second user input stroke.

In further carrying out the above objects and other objects of the present invention, a system is also provided for carrying out the steps of the above described method.

The system of the present invention includes a means for generating a first electrical signal corresponding to a first user input stroke. The system also includes a means for comparing a first electrical signal to a first predetermined electrical signal which corresponds to a first predetermined user input stroke along at least a portion of the surface of a touch-sensitive screen.

The system further includes a means for displaying a plurality of icons on the touch-sensitive screen so that the first electrical signal matches the first predetermined electrical signal.

In addition, the system includes a means for generating a second electrical signal corresponding to a second user input stroke. The system further includes a means for comparing the second electrical signal to a second predetermined electrical signal which corresponds to a second predetermined user input stroke selecting one of the plurality of icons on the touch-sensitive screen.

Still further, the system includes a means for displaying a working window on the touch-sensitive screen if the second electrical signal matches the second predetermined electrical signal.

The above objects, features and advantages of the present invention, as well as others, are readily apparent from the following detailed description of the best mode for carrying out the invention when taken in connection with the accompanying drawings.

BRIEF DESCRIPTION OF THE DRAWINGS

The present invention will be apparent from the detailed description taken in conjunction with the accompanying drawings in which.

BEST MODE FOR CARRYING OUT THE INVENTION

Figure 1:
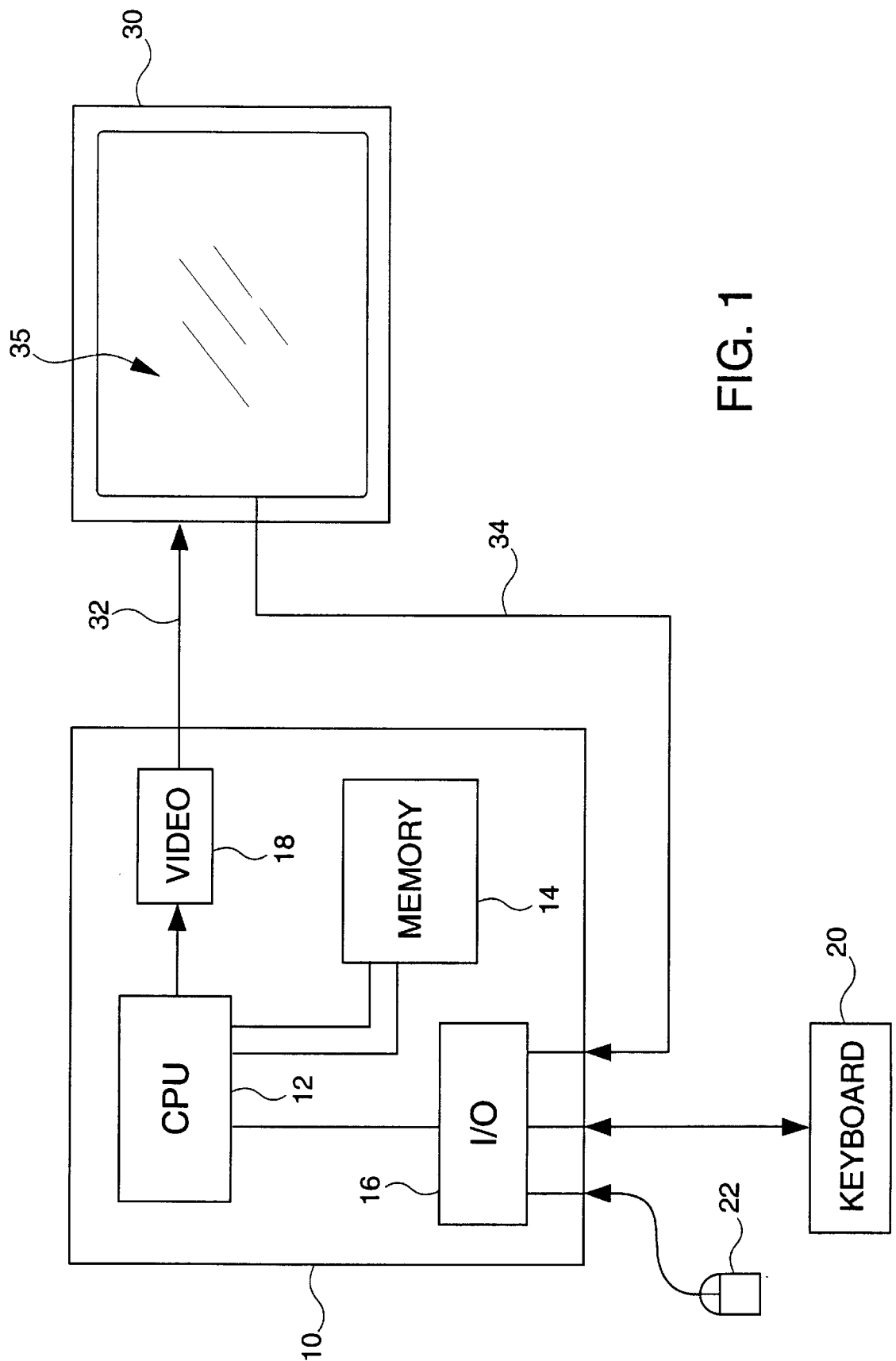
FIG. 1 is a block diagram of a computer system in which the method according to the present invention is performed.

Referring now to the drawings, FIG. 1 is a block diagram of a computer system in which the method according to the present invention is performed. The computer system comprises a computer board 10, which includes a Central Processing Unit (CPU) 12, a memory unit 14, an input/output port 16 and a video controller 18. The computer system also includes a keyboard 20, a mouse 22, and a video monitor 30. The keyboard 20 and the mouse 22 are both coupled to the input/output port 16.

The CPU 12 is in electrical communication with the video controller 18, the memory 14, and the input/output port 16. The CPU 12 includes electronic componentry, including a commercially available microprocessor, and executes software, permitting the CPU 12 to control the computer system. In general, the CPU 12 operates to display the working windows and various icons in the computer system and to activate the corresponding computer programs. For example, the CPU 12 functions as control means for generating a first electrical signal corresponding to a first user input stroke, a control means, or comparator, for comparing the first electrical signal to a first predetermined electrical signal, and control means for executing the computer program corresponding to the icon selected by the user.

The memory unit 14 is used to store the predetermined electrical signals corresponding to the predetermined user input strokes.

In the preferred embodiment of the present invention, the video monitor 30 is equipped with a touch-sensitive screen 35, which overlays the video monitor. The video monitor 30 is coupled to the video controller 18 by a lead 32. The lead 32 carries the video information that is displayed on the video monitor 30. A lead 34 couples the touch-sensitive screen 35 to the input/output port 16. The lead 34 carries an electrical signal that is based upon a sensed change in capacitance on the touch-sensitive screen 35. The electrical signal is read by the CPU 12 to produce an X,Y signal that indicates where a user has touched the touch-sensitive screen 35.

An example of a touch-sensitive screen 35 is a Mac-n-Touch™ model made by the Micro-Touch company. This screen has a resolution of 480 vertical gradations by 640 horizontal gradations. The details of the computer system shown in FIG. 1 are well known to those skilled in the art and therefore will not be discussed further.

Figure 2:
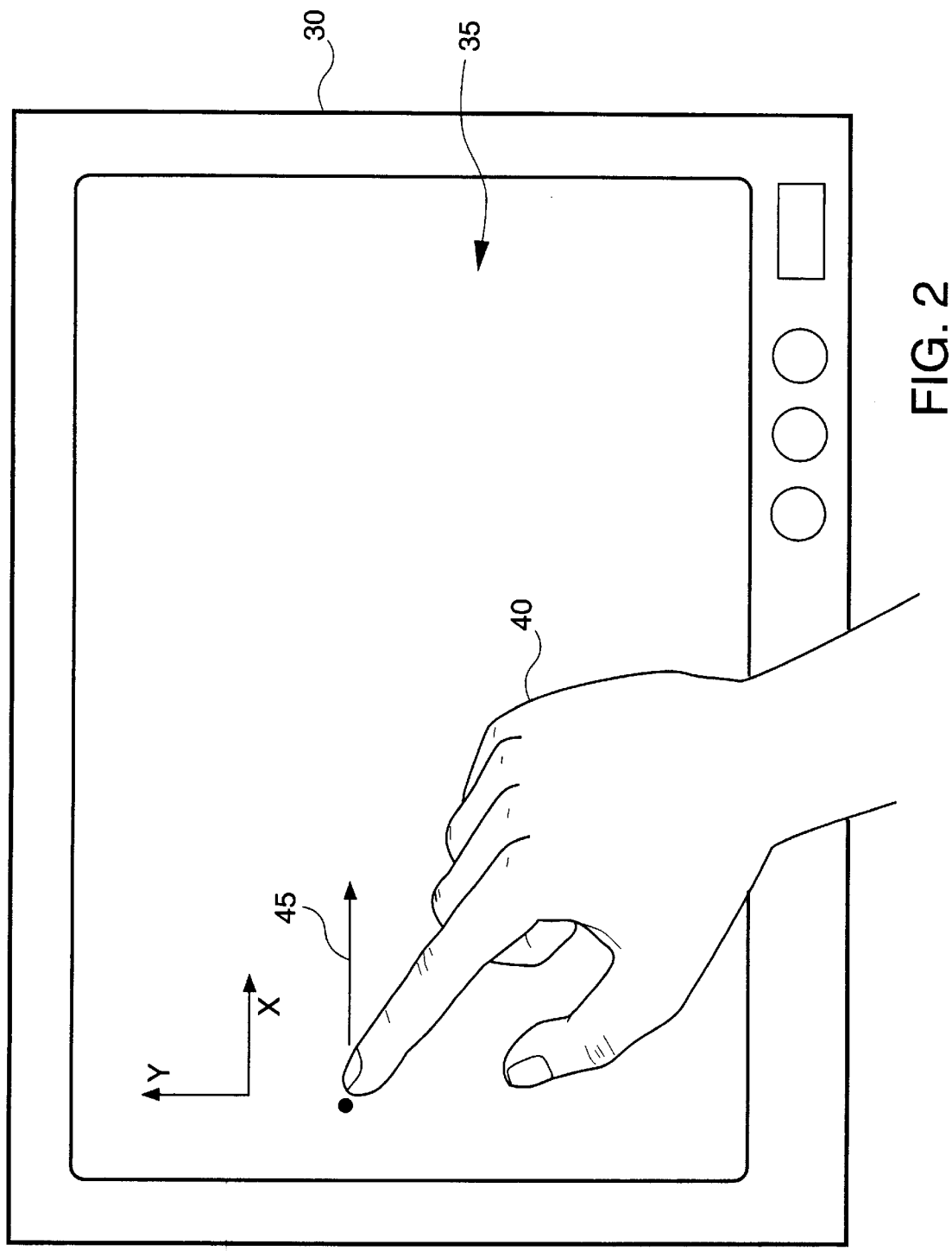
FIG. 2 is a schematic diagram of a user performing an input stroke on a computer screen in order to bring out a working window according to the method of the present invention.

As described above, the present invention is a method of generating a working window on the video monitor 30 in a way that is intuitive for a user of the computer system and does not require the use of a mouse or a keyboard. FIG. 2 shows how a user of the computer system touches the touch-sensitive screen 35 to bring out the working window according to the present invention.

According to a preferred embodiment of the present invention, the user touches the touch-sensitive screen 35 with his/her hand 40 near a predetermined area of the touch-sensitive screen 35, for example, the left-hand edge of the screen 35. The user then draws his/her finger across the touch-sensitive screen 35 using a first predefined input stroke. The first predefined input stroke is defined as a continuous movement on the touch-sensitive screen 35 from the predetermined area to a predetermined interior portion of the touch-sensitive screen 35. That is, the user performs a short horizontal stroke along at least a portion of the touch-sensitive screen 35 with his/her finger in the direction of arrow 45. The arrow 45 does not appear on the video monitor but is shown merely for purposes of illustrating the first predetermined user input stroke.

The arrow 45 is substantially parallel to an X-axis of the display screen 35 where, for the purposes of the present description, the X-axis is the horizontal axis of the touch-sensitive screen 35 while a Y-axis denotes the vertical axis of the touch-sensitive screen 35.

By touching the touch-sensitive screen 35, the CPU 12 detects the first user input stroke and generates a first electrical signal corresponding thereto. The CPU 12 then compares the first electrical signal to a first predetermined electrical signal. The first predetermined electrical signal corresponds to a first predetermined user input stroke along at least a portion of the surface of the touch-sensitive screen 35.

In the preferred embodiment illustrated above, the first predetermined user input stroke is defined as a continuous horizontal movement by the user's finger on the touch-sensitive screen 35 from a point sufficiently near (e.g., within 2 cm of) the left-hand side of the touch-sensitive screen 35 towards the center of the screen 35. Alternatively, the first predetermined user input stroke may be defined as a continuous vertical movement by the user's finger on the touch-sensitive screen 35 from a point sufficiently near the upper edge of the screen 35 towards the center of the screen 35.

Figure 3B:
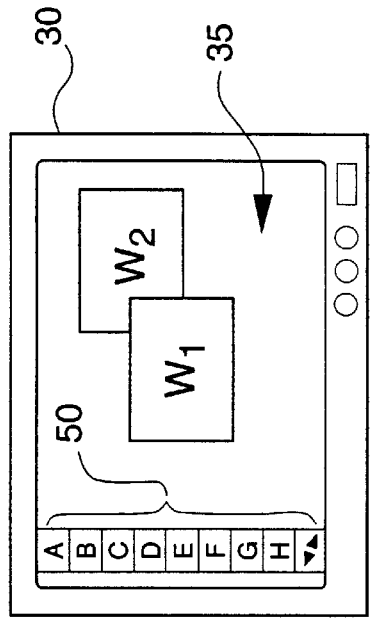
FIGS. 3A–3C are schematic diagrams illustrating how a working window is displayed on a computer screen according to the method of the present invention.
Figure 3C:
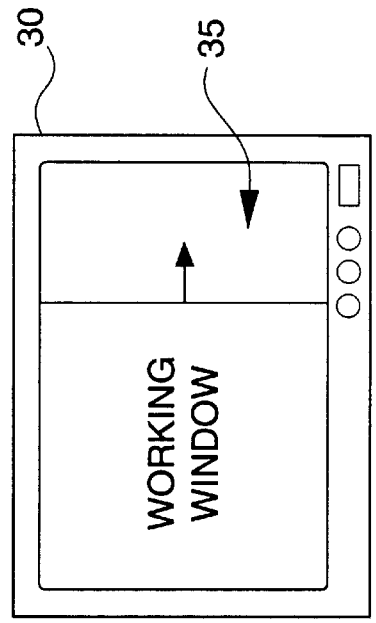
Figure 3A:
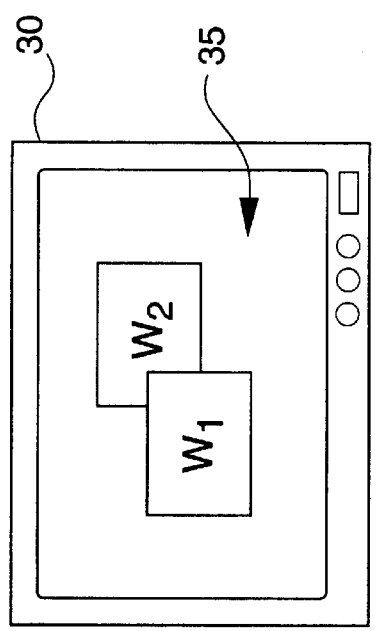

FIGS. 3A–3C illustrate the outcome on the video monitor 30 when the user performs the first predetermined input stroke on the touch-sensitive screen 35 as described above. FIG. 3A illustrates the video monitor 30 before the user has drawn the first predetermined input stroke to bring forth the working window. The video monitor 30 is showing any of a number of windows w1, w2 as are commonly displayed by a computer system.

The CPU 12 displays a plurality of icons 50 on the touch-sensitive screen 35 if the first electrical signal matches the first predetermined electrical signal, or first predetermined user input stroke, as shown in FIG. 3B. Each icon A-H corresponds to a computer program that can be run in the working window that appears on the screen 35 as a result of the user performing the first predetermined input stroke. In the preferred embodiment, the plurality of icons 50 are displayed in a line along a predetermined edge of the monitor 30. The display shown in FIG. 3B remains on the video monitor until the CPU 12 detects a second predetermined user input stroke.

Upon touching the touch-sensitive screen 35, the CPU generates a second electrical signal corresponding to a second user input stroke. The CPU 12 then compares the second electrical signal to a second predetermined electrical signal. The second predetermined electrical signal corresponds to the second predetermined user input stroke selecting one of the plurality of icons 50 displayed on the screen 35. The second predetermined user input stroke is defined as momentarily touching one of the plurality of icons 50 displayed on the screen 35.

The CPU 12 then displays a working window on the screen 35, as shown in FIG. 3C, if the second electrical signal matches the second predetermined electrical signal, or second predetermined user input stroke, indicating the user has selected one of the plurality of icons 50. The working window associated with the icon selected by the user is scrolled onto the video monitor 30 from the left-hand side of the video monitor. The size of the working window is variable and depends upon which icon the user has selected. For example, some programs represented by the different icons may require more monitor area than others.

After generating the working window on the screen 35, the CPU 12 then executes the computer program corresponding to the icon selected by the second predetermined user input stroke.

After the user is finished with the program that is running in the working window, the user must perform a third predetermined input stroke in order to remove the window from the monitor. The third predetermined user input stroke is substantially the reverse of the first predetermined user input stroke. The third predetermined user input stroke may be defined as a substantially continuous horizontal movement by the user's finger from an interior portion of the screen 35 to the predetermined area or edge of the screen 35. Alternatively, the third predetermined user input stroke may be defined as a substantially continuous vertical movement by the user's finger from an interior portion of the screen 35 to the predetermined area or edge of the screen 35.

Upon touching the screen 35, the CPU 12 generates a third electrical signal corresponding to a third user input stroke. The CPU 12 then compares the third electrical signal to a third predetermined electrical signal. The third predetermined electrical signal corresponds to the third predetermined user input stroke along at least a portion of the touch-sensitive screen 35.

Finally, the CPU 12 removes the working window from the screen 35 if the third electrical signal matches the third predetermined electrical signal, thereby scrolling the working window off the video monitor to the left to return the screen to that shown in FIG. 3A.

Consequently, the user always has access to a working window that appears to the user to be disposed adjacent a left-hand side of the video monitor. The user can pull the working window onto the video monitor at any time by performing the first predetermined user input stroke and can remove the window by performing the third predetermined user input stroke as described above. It should be noted, however, that the working window of the above described method and system can be designed to be displayed and removed from any edge of the video monitor or even from the center of the monitor.

The present method of generating a working window on a video monitor makes the computer system appear more like a real world desk where the user can get a clean sheet of paper by simply dragging a clean sheet of paper from the left-hand side of the desk and placing it into the working area of the desk. The user does not have to enter the command to bring out the working window through a mouse or a keyboard. Furthermore, the method of the present invention does not clutter the screen by producing numerous haphazardly placed windows on the screen. By restricting the video monitor to a working window that overlaps most of the monitor, the user is allowed to more easily concentrate on the application program that is being run. Once the user has finished with the working window, it is moved off the monitor without cluttering the previously displayed windows. Finally, the present method of generating a working window is as intuitive to the user as getting a clean sheet of paper and placing it on the desk top. The user does not have to remember any special commands that have to be typed in or remember how to move the mouse to generate the working window.

Figure 4A:
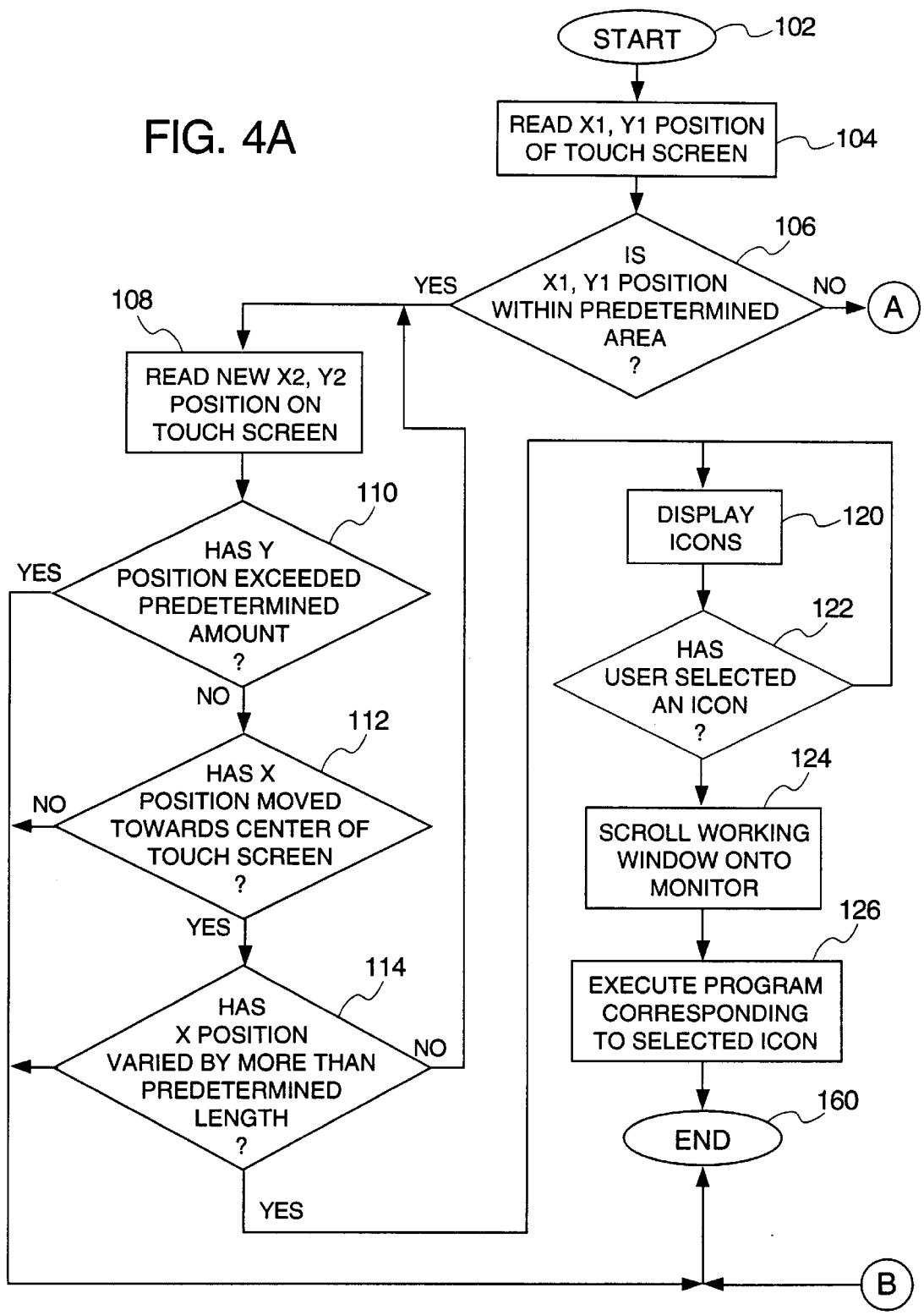
FIGS. 4A–4B are a flow chart illustrating the method of the present invention.
Figure 4B:
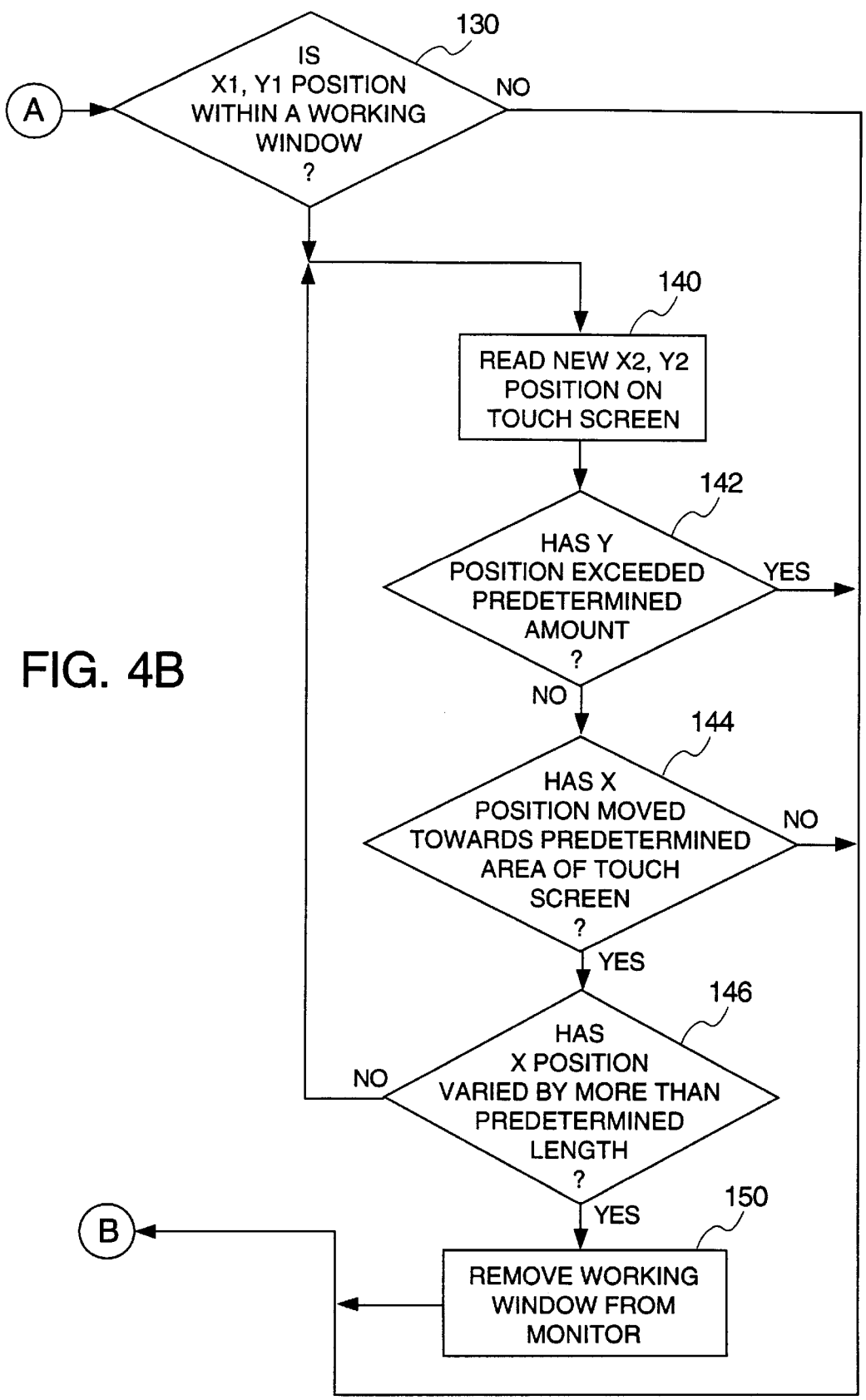

FIGS. 4A–4B are a flow chart illustrating the general sequence of steps executed by the CPU 12 to generate the working window according to the present invention. Briefly summarized, the CPU 12 determines where the user has touched the touch-sensitive screen 35 and monitors the movement by the user to determine if the user has performed the first or third predetermined user input is stroke as described above. If the CPU 12 detects the first predetermined user input stroke, the plurality of icons are displayed on the screen 35 for selection by the user via a second predetermined user input stroke. Upon detecting the second predetermined user input stroke indicating an icon has been selected, the working window is displayed on the video monitor. Upon detecting the third predetermined user input stroke, the working window is removed from the video monitor.

The method begins at block 102 when the user touches the touch-sensitive screen 35. Touching the touch-sensitive screen 35 causes an interrupt which in turn causes the CPU 12 to read the X,Y position corresponding to where the user has touched the touch-sensitive screen 35, as shown by block 104.

Next, as shown by conditional block 106, the method includes the step of determining if the initial starting position X1, Y1 is within a predetermined area or edge of the touch-sensitive screen 35. The predetermined area or edge may be defined as the left-hand edge of the screen 35. The predetermined area or edge is user definable, but is preferably set to two centimeters along the left-hand edge of the screen 35.

If the user has touched the touch-sensitive screen 35 within the predetermined area, the method proceeds to block 108 that begins a loop tracking the user's finger on the touch-sensitive screen 35 by reading a new ending position X2, Y2. Unless exited in one of the manners described below, the loop repeats at some predetermined interval of time, tl, equal to, for example, 10 milliseconds.

After the second position, X2, Y2, is determined at block 108 the first time through the loop, the method proceeds to block 110 to begin determining whether the user has performed the first predetermined user input stroke. At block 110, the method determines if the change in the starting and ending position of Y has exceeded a predetermined amount, e.g., Y2–Y1<21.5 cm. As described above, the predetermined user input strokes that generate and remove a working window are defined as substantially continuous horizontal movements along at least a portion of the touch-sensitive screen 35. Therefore, if the user moves his/her finger in the Y direction by more than the predetermined amount, the method determines that the user has not performed either the first or third predetermined user input strokes. If the Y2–Y1 has changed by more than the maximum allowed amount, the method ends at block 160.

If the user has not moved his/her finger by more than the maximum allowed amount in the Y direction, the method proceeds to block 112 to determine if the user has moved his/her finger in the X direction, i.e., X2–X1>0 cm, towards the center of the screen 35. If the user has not moved his/her finger towards the center of the screen, the method ends at block 160.

If the user has moved his/her finger towards the center of the screen 35, the method proceeds to block 114 to determine if the user has moved his/her finger in the X direction by more than a predetermined length. In the preferred embodiment, the input strokes are at least three centimeters long. Therefore, if the user has not moved his/her finger at least three centimeters in the X direction towards the center of the screen 35, the method returns to block 108 and a new X,Y position on the touch-sensitive screen 35 is read. If the user has moved his/her finger three centimeters towards the center of the screen 35, the method proceeds to block 120 wherein the plurality of icons are displayed as is shown in FIG. 3B.

After block 120, the method determines if a user has performed a second predetermined user input stroke, as shown by block 122. The second predetermined user input stroke is defined as momentarily touching one of the plurality of icons displayed on the screen 35. The method determines if the user has performed the second predetermined user input stroke by reading the X,Y coordinates corresponding to where the user has touched the touch-sensitive screen 35 and comparing those coordinates to a list of X,Y coordinates for each icon. If the user has touched the touch-sensitive screen 35 at a point that is occupied by one of the icons displayed on the video monitor 30, the CPU 12 determines that the user has selected that icon. If the user has not touched the touch-sensitive screen 35 at a point that is occupied by one of the icons, the method returns to block 120 until an icon is selected.

After the user has selected one of the plurality of icons, the method proceeds to block 124 and displays a working window on the video monitor 30 in the manner shown in FIG. 3C. After the working window is displayed, the method continues with the step of executing the computer program corresponding to the icon selected by the second user input stroke, as shown by block 126. The method then concludes at block 160.

If the user does not initially touch the touch-sensitive screen 35 within the predetermined distance from the left-hand edge, as determined at block 106, the method proceeds, as shown by block 130, to determine if the user has touched the touch-sensitive screen 35 within the working window. If the user has not touched the touch-sensitive screen 35 within the working window, the method concludes at block 160.

If the user has touched the touch-sensitive screen 35 within the working window, the method begins a loop that tracks the position of the user's finger to determine if the user has performed the third predetermined user input stroke in order to remove the working window. The loop begins at block 140 where the ending position of the user's finger is determined by reading the ending position X2, Y2.

The method proceeds to block 142 to determine if the change in the Y position has exceeded a predetermined amount, i.e., Y2–Y1>1.5 cm. As described above at block 110, if the user has moved his/her finger in the Y direction by more than the maximum allowed amount, the method determines that the user is not performing the third predetermined user input stroke in order to remove the working window. Consequently, the method concludes at block 160.

If the user has not moved his/her finger by more than the maximum allowed amount in the Y direction, the method proceeds to block 144 to determine if the user's finger has moved in the X direction towards the left-hand edge of the touch-sensitive screen 35, i.e., X2–X1>0. If the user has not moved his/her finger from the working window towards the left-hand edge of the touch-sensitive screen 35, the method concludes at block 160.

If the user has moved his/her finger towards the left-hand edge of the touch screen, the method proceeds to block 146 to determine if the user has moved his/her finger in the X direction by more than a predetermined length, e.g., X2–X1<–3 cm. If the user has not moved his/her finger in the X direction by more than the predetermined length, the method returns to block 140 to read a new X,Y position.

If the user has moved his/her finger in the X direction by more than the predetermined length, the method proceeds to block 150 and removes the working window from the screen 35 before ending at block 160.

While the best modes for carrying out the invention have been described in detail, those familiar with the art to which this invention relates will recognize various alternative designs and embodiments for practicing the invention as defined by the following claims.

What is claimed is:

1. For use in a computer system that includes a memory, a method for displaying a working window, the method comprising:

providing a touch-sensitive surface for providing user input thereon;

providing a display screen for displaying none, one, or more windows and/or icons;

defining in the memory an input stroke, said input stroke corresponding to the touching of the touch-sensitive surface at a first location and continuing in a first direction to a second location, wherein said input stroke is not related to a displayed window and/or icon;

defining in the memory a plurality of icons each icon representing a working window;

providing a first user input stroke;

comparing the first user input stroke with the input stroke defined in memory;

displaying the plurality of icons on the display screen in response to the comparing step;

selecting a displayed icon; and displaying a working window corresponding to the selected icon, wherein the working window is displayed on the display screen.

2. The method of claim 1 further including executing a computer program corresponding to the selected icon.

3. The method of claim 1 wherein the plurality of icons are displayed in a line along an edge of the display screen.

4. The method of claim 1 wherein the first user input stroke is a continuous movement on the touch-sensitive surface from an exterior portion of the touch-sensitive surface to an interior portion of the touch-sensitive surface.

5. The method of claim 1 wherein the first user input stroke is a continuous movement on the touch-sensitive surface corresponding to a point on the exterior portion of the display screen to an interior portion of the display screen.

6. The method of claim 1 wherein the first user input stroke is a substantially horizontal movement.

7. The method of claim 1 wherein the first user input stroke is a substantially vertical movement.

8. The method of claim 1 wherein the first location is an edge of the touch-sensitive surface.

9. The method of claim 1 wherein the first location corresponds to an edge of the display screen.

10. The method of claim 1 wherein the first user input stroke is a continuous movement on the touch-sensitive surface from an interior portion of the touch-sensitive surface to an exterior portion of the touch-sensitive surface.

11. The method of claim 1 wherein the first user input stroke is a continuous movement on the touch-sensitive surface corresponding to a movement from an interior portion of the display screen to an exterior portion of the touch-sensitive surface.

12. The method of claim 1 wherein the step of displaying a working window further comprises:

scrolling the working window onto the display screen.

13. The method of claim 1 further comprising:

providing a second user input stroke that begins at a location on the touch-sensitive surface that corresponds to a point within the displayed working window on the display screen and continues in a second direction; and removing the working window from the display screen in response to the second user input stroke.

14. The method of claim 13 wherein the second user input stroke is a continuous movement on the touch-sensitive surface from a first point corresponding to a point within the working window to a second point corresponding to a predetermined area of the display screen.

15. The method of claim 14 wherein the second user input stroke is substantially the reverse movement of the first user input stroke.

16. A system for displaying a working window on a display screen, the system comprising:

a touch-sensitive surface for providing user input thereon;

a display screen for displaying none, one, or more windows and/or icons;

memory for storing an input stroke, said input stroke corresponding to the touching of the touch-sensitive surface at a first location and continuing in a first direction to a second location, wherein said input stroke is not related to a displayed window and/or icon;

memory for storing a plurality of icons, each icon representing a working window;

means for providing a first user input stroke on the touch-sensitive surface;

means for comparing the first user input stroke with the input stroke defined in memory;

means for displaying the plurality of icons on the display screen in response to the comparing step;

means for selecting a displayed icon; and means for displaying a working window corresponding to the selected icon, wherein the working window is displayed on the display screen.

17. The system of claim 16 further including means for executing the computer program corresponding to the icon selected by the user.

18. The system of claim 16 further comprising:

means for providing a second user input stroke that begins at a location on the touch-sensitive surface that corresponds to a point within the displayed working window on the display screen and continues in a second direction; and means for removing the working window from the display screen in response to the second user input stroke.

19. The method of claim 16 wherein the step of displaying a working window further comprises:

scrolling the working window onto the display screen in a first direction.

20. For use in a computer system that includes a memory, a method for displaying a working window, the method comprising:

providing a display screen for displaying none, one, or more windows and/or icons;

providing a user input device for generating a user input stroke;

defining in the memory an input stroke, said input stroke corresponding to movement from a first location on the display screen and continuing in a first direction to a second location, wherein said input stroke is not related to a displayed window and/or icon;

defining in the memory a plurality of icons each icon representing a working window;

generating a first user input stroke;

comparing the first user input stroke with the input stroke defined in memory;

displaying the plurality of icons on the display screen in response to the comparing step;

selecting a displayed icon; and displaying a working window corresponding to the selected icon, on the display screen.

21. The method of claim 20 further including executing a computer program corresponding to the selected icon.

22. The method of claim 20 wherein the plurality of icons are displayed in a line along a predetermined edge of the display screen.

23. The method of claim 20 wherein the first user input stroke corresponds to a continuous movement from a point on the exterior portion of the display screen to an interior portion of the display screen.

24. The method of claim 20 wherein the first user input stroke corresponds to a continuous movement from a point on the interior portion of the display screen to an exterior portion of the display screen.

25. The method of claim 20 wherein the first user input stroke is a substantially horizontal movement.

26. The method of claim 20 wherein the first user input stroke is a substantially vertical movement.

27. The method of claim 20 wherein the first location corresponds to an edge of the display screen.

28. The method of claim 20 wherein the step of displaying a working window further comprises:

scrolling the working window onto the display screen in a first direction.

29. The method of claim 20 wherein the step of displaying the plurality of icons further comprises:

scrolling the icons onto the display screen in a first direction.

30. The method of claim 20 further comprising:

providing a second user input stroke that begins at a location that corresponds to a point within the displayed working window on the display screen and continues in a second direction; and removing the working window from the display screen in response to the second user input stroke.

31. The method of claim 30 wherein the second user input stroke is a continuous movement of from a first point corresponding to a point within the working window to a second point corresponding to a predetermined area of the display screen.

32. The method of claim 30 wherein the second user input stroke is substantially the reverse movement of the first user input stroke.

\* \* \* \* \*